Figure 1:
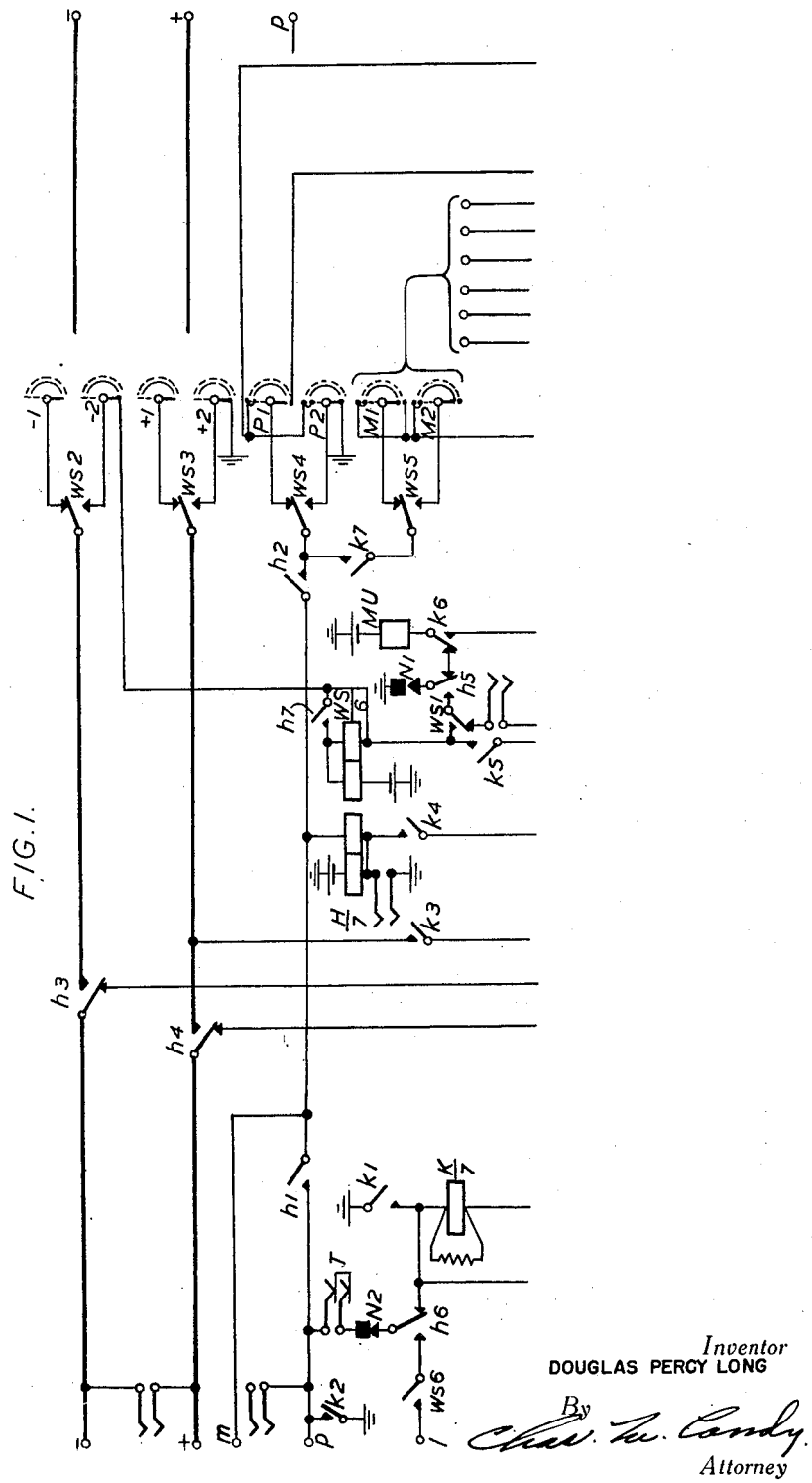

July 4, 1950            D. P. LONG            2,513,949

SELECTING SWITCH FOR USE IN TELEPHONE SYSTEMS

Filed April 25, 1946            2 Sheets-Sheet 1

Inventor
DOUGLAS PERCY LONG

Attorney

Patented July 4, 1950

2,513,949

UNITED STATES PATENT OFFICE 2,513,949

SELECTING SWITCH FOR USE IN TELEPHONE SYSTEMS

Douglas Percy Long, Chislehurst, England, assignor to Siemens Brothers & Co. Limited, London, England, a British company Application April 25, 1946, Serial No. 664,961
In Great Britain May 4, 1945

10 Claims. (Cl. 179—18)

This invention relates to automatic telephone systems and more particularly to systems in which the selecting switches are high speed uniselectors of the kind in which a pair of electrically connected staggered wipers are adapted to be driven in succession over two arcs of contacts, outlets from which are adapted to be marked by a digit registering device. In the use of such a switch it has been proposed to drive the wipers over one arc of contacts to a predetermined position at the commencement of the second arc of the pair when it has been determined that the outlets to be searched are connected to the second arc. This preliminary movement of the wipers may take place in response to particular first digits received at the selector, the first or a second digit determining the outlet required or groups of outlets to be searched. Groups of outlets denoted by a single digit would be connected to the first arc of the pair and no preliminary wiper movement would take place. Also, to prevent wiper movement until all the impulses of a train have been received it is usual, in the marking system, to include in the circuit of the driving magnet a break contact of a relay which is operated prior to impulse reception and released at the end of a train of impulses. Such a relay is frequently referred to as a dialling relay. If selection is to depend on the receipt of two trains of impulses and the wipers are required to execute a preliminary movement as above mentioned, the re-operation of the dialling relay before such preliminary movement has been completed must be prevented.

According to one feature of the present invention in a selector adapted to be set in response to two trains of impulses, if the first train of impulses denotes an outlet or group of outlets to be selected in response to a second train of impulses a driving circuit for the selector is closed and a test is made after the end of the first impulse train received at the selector to determine if a preliminary movement of the wipers to a predetermined contact position is required. If no such movement is required, the driving circuit is cut immediately before the switch wipers are moved from their normal position. The test is preferably made by the usual test relay. The preliminary testing circuit includes contacts that are closed consequent on the response of the digit registering device to a single or first impulse train that does not require a preliminary movement of the switch wipers so that on the application of the testing relay to the preliminary testing circuit the relay will operate immediately and prevent operation of the selector driving mechanism. If the digit registering device has been set in response to some other digital value, the testing circuit will not be closed and the selector wipers will be driven to the predetermined contact position. In this latter position a circuit for the testing relay will be provided over a wiper or wipers of the selecting switch and this circuit may also include contacts closed by the digit registering device consequent on its response to impulses of a first impulse train that requires the preliminary movement of the selector, the bank of which will be marked subsequently by impulses of a second train. The testing circuit in which the testing relay is operated immediately to prevent movement of the selector wipers may also include a contact or contacts in the selecting switch bank in the normal position of the wipers. If the testing relay used for the preliminary test is the usual test relay it will be necessary to prevent its operation bringing about the operation of the switching relay in the selector.

The circuit of the latter relay may be controlled by an auxiliary test relay normally operated by the operation of the test relay, a second winding of the auxiliary test relay being included in the preliminary testing circuit, the connection being such that when both windings are energised the created fluxes oppose one another and the relay does not operate.

According to another feature of the invention the preliminary test circuit includes a steering relay a contact of which is included in the circuit for pre-operating the dialling relay. The circuit for the initial operation of the dialling relay includes a back contact of the steering relay and a contact which is opened on and held open after receipt of the first impulse of the first received train of impulses and the circuit for the pre-operation of the dialling relay in readiness for a second impulse train includes a front contact of the steering relay and a contact which is opened on and held open after the receipt of the first impulse of the second received train. These contacts may be off-normal contacts of a digit switch on which the received digits are registered for marking the selector or they may be normal contacts of a pair of digit switches, one for each impulse train. The dialling relay is held during impulsing in the circuit over which the impulses are repeated in the normal manner and if two digit switches are employed a contact of the steering relay may be included in the impulse repeating circuit to connect up the magnets of the two digit switches in turn. The steering relay would be arranged to lock up on operation.

It is convenient for all the outlets of a group to be connected in one arc of a pair in the selecting switch bank but their positions in that arc need not be consecutive. The arrangements of the invention enable a "last contact" position to be provided at the end of each arc of a pair and in order to permit the wipers to pass this position in their preliminary movement it is arranged that the circuit over these last contact positions is only connected up when the wipers are positioned at the commencement of the arc in which search is to be made. This connection of the "last contacts" in the selector arcs is conveniently made by the steering relay connected in the preliminary testing circuit as this relay will be operated when the wipers are in the desired position.

Reference will now be had to the accompanying drawings which show by way of example an embodiment of the invention.

Figure 2:
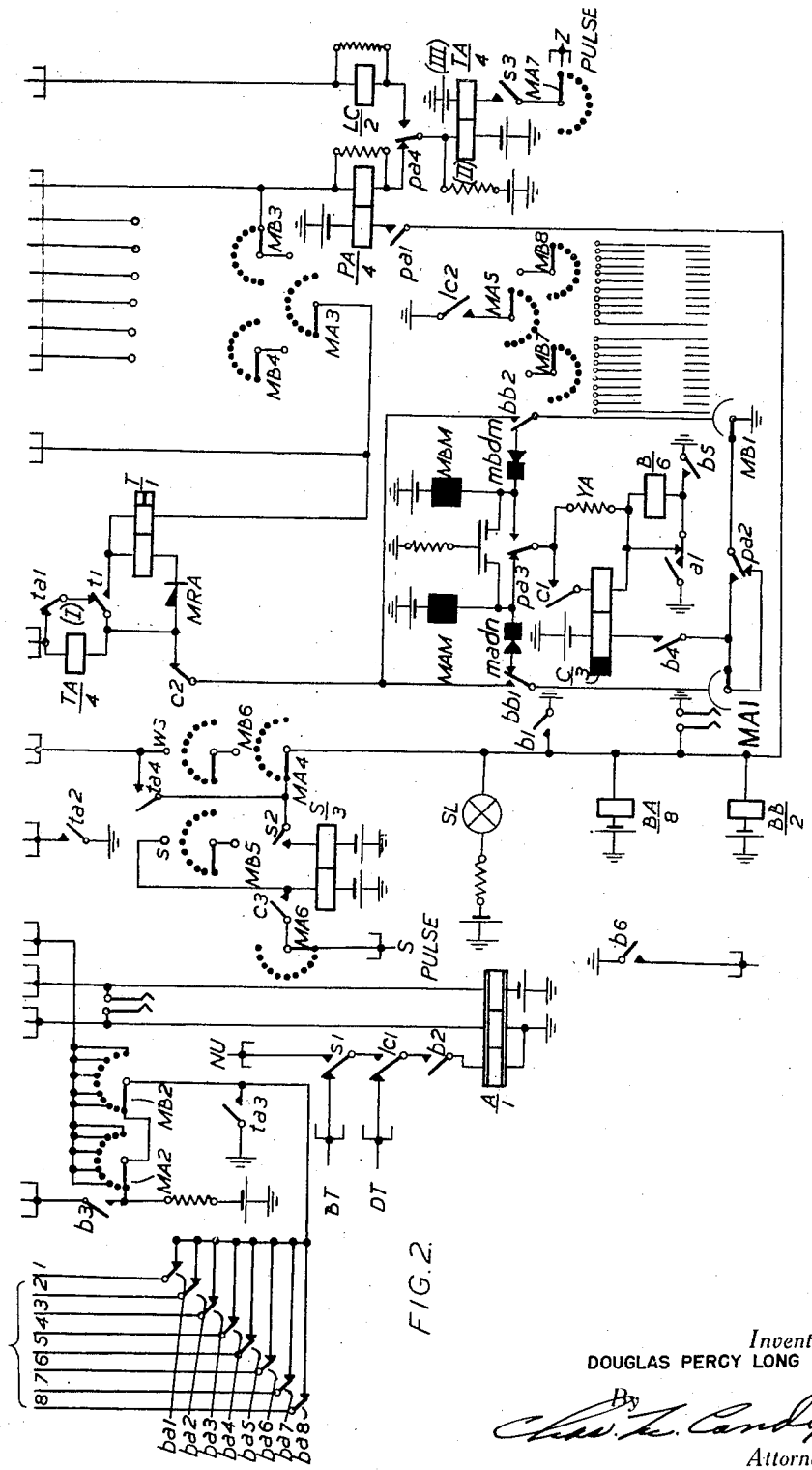

The drawings show, in Fig. 1, the circuit of a first selector in which the incoming wires are switched directly through to the selector wipers and in Fig. 2 a common control circuit for the control of a group of first selectors of which the selector shown in Fig. 1 is one. The first selector illustrated in the drawing is a single motion switch having 200 outlets, access to one hundred outlets being had over back contacts of a wiper switching relay and access to the other hundred outlets being had over front contacts of the wiper switching relay. The contact bank of the selector comprises 16 arcs of 52 contacts each, the arcs being paired, the two arcs of a pair being traversed respectively by the two ends of a wiper in succession, one end of the wiper entering one arc after the other end of the wiper leaves its associated arc. The arcs over which the wipers first sweep are indicated in full lines and are swept by the ends of the wipers shown in full lines and the arcs over which wipers sweep after traversing the full lines arcs are indicated in broken lines and are swept by the ends of the wipers shown in broken lines. The wipers are denoted by the characters —, +, P and M for the negative and positive line wire wipers, the test and holding wire wipers and the marking wipers, a numeral indicating the wipers associated with arcs of contacts of a particular group of one hundred outlets. The selector is driven by the individual electric motor under the control of a magnet, the driving mechanism being represented generally by the magnet MU. There are two off-normal contacts N1 and N2 operated when the wipers leave the position at the commencement of the bank on which they normally rest. The normal contacts are not connected to outlets but are used for giving an indication that the switch is improperly held, such as by a fault on the line or by a subscriber's removing his receiver and failing to dail. The next 50 contacts are connected to outlets and the 52nd contact is not used. In the broken line arcs the first contact in the arc of wiper P1 is concerned with stopping the switch at the end of its preliminary movement and the last or 52nd contacts in the test arcs are connected to a circuit for stopping the switch if no free outlet in a desired group has been found and for giving a busy signal. The intermediate 50 contacts are connected to outlets. The 100 contacts in the banks of wipers M corresponding to outlet positions are connected to banks of marking switches in the common control circuit. The selector circuit includes a coupling relay K for coupling the selector to the common control circuit serving it, the switching relay H and the wiper switching relay WS, and an alarm lamp and relay are adapted to be connected to the front contact ws6 of relay WS. The wiper switching relay WS besides its connection to an operating circuit for wiper switching purposes is connected to the normal contact in the arc of wiper —2, the earth for the relay being connected to the normal contact in the arc of wiper +2.

The common control circuit includes the impulse receiving relay A, release relay B and its auxiliary relays BA and BB, slow releasing dialling relay C, high speed test relay T and auxiliary relay TA, time pulse relay S, steering relay PA and last contact relay LC. Relay TA has three windings, two of which designated I and II are wound so as to be differential when energised at the same time. The circuit also includes two marking switches MA and MB, switch MA being operated by a first or only digit and switch MB by a second digit. The marking switches are illustrated as being of the pawl and ratchet stepping type, the driving magnets being designated MAM and MBM, respectively. The switch MA has 7 wipers designated MA1 . . . MA7 and the switch MB has 8 wipers designated MB1 . . . MB8. Wipers MA1 and MB1 are homing wipers and they are also included in the test circuit for testing outlets of a group selected by one or two digits respectively. Wipers MA2 and MB2 are concerned with passing forward a discriminating signal to cause a pre-selection of one of two main groups of outlets from the succeeding selector, wipers MA3, MB3, and MB4 are marking wipers and wipers MA5, MB7 and MB8 are wipers connected similarly to the marking wipers for the operation of overflow meters, wipers MA4, MB5 and MB6 are concerned with the operation of wiper switching relay WS for the selection of one or other main group of one hundred outlets, wiper MA6 is included in the circuit of time pulse relay S, and wiper MA7 is included in a circuit for relay TA by a "Z" timepulse. The banks of contacts associated with the marking wipers MA3, MB3 and MB4 are connected as required to the marking arcs on the selectors, outlet groups selectable by one digit being connected in the full line arcs of the selecting switch, the corresponding contacts in the M arcs being connected to contacts in the bank of wiper MA3. Outlets of groups selectable by two digits may be connected in either arc of a pair in the selecting switch, the corresponding contacts in the M arcs being connected to contacts in the banks of wiper MB3 or MB4. The marking switches have magnet operated contacts madm and mbdm respectively.

The general arrangements of the circuits having been dealt with, the detailed operations involved in the selection of a free outlet in a desired group will now be described.

The selector and common control circuit test free by reason of the battery connection to wire p over contacts N2, h6, ba1 and wipers MB2 and MA2 in their normal positions. Contacts ba2 . . . ba8 are included in the test-in circuit for 7 other selectors served by the same common control circuit. When the selector is taken into use, relay A is operated over contacts h3 and h4 and a preceding loop and at contact a1 closes a circuit for relay B over resistance YA, contact pa3 and magnet MAM. Relay B operates and at contact b1 closes circuits for relays BA and BB and lights the supervisory lamp SL. Contact b2 connects dialling tone over wire DT and contact lc1 to the left hand winding of relay A whence it is induced into the line, contact b3 connects battery to relay K which at this time does not operate because of the short circuit across relay K through the ba contact, contact b4 closes a circuit from earth over wiper MB1 in its normal position, contact pa2 and wiper MA1 in its normal position for the left hand winding of relay C, contact b5 prepares a holding circuit for relay C during impulsing and contact b6 closes a circuit for starting the tone generator. Relay BB at contacts bb1 and bb2 opens the homing circuit for the marking switches and closes points in the test circuit and the circuit of magnet MU of the selector. Relay BA on operation opens at its 8 contacts the test-in-circuits for the several selectors served by the common control circuit illustrated to prevent their being taken into use while the common control circuit is in use and removes the short from across relay K. Relay C operates and at contact c1 prepares an operating circuit for magnet MAM and a temporary holding circuit for itself, at contact c2 opens a point in the circuit for magnet MU to guard against its operation during impulse reception and at contact c3 connects the "S" pulse wire over wiper MA6 in its normal position to relay S. Relay K operates from ground over the p test wire from the preceding switch and locks up at contact k1, applies a guarding earth to the test wire p at contact k2, connects the positive wire to contacts in the banks of wipers MA2 and MB2 at contact k3, closes points in circuits for relay WS and magnet MU at contacts k5 and k6 respectively, and connects up the test circuit at contact k7.

Impulses should now be received and relay A will respond to the impulses and at contact a1 repeat them in a circuit from earth over contacts b5, a1, low resistance right hand winding of relay C, contacts c1, pa3, magnet MAM to battery. Magnet MAM operates and steps the marking switch MA in accordance with the number of impulses received. Relay B is rendered slow to release by the short circuit closed across it every time relay A restores and relay B will not release during impulsing. As soon as switch MA takes its first step the operating circuit for relay C is opened at wiper MA1 and that relay depends for its continued operation on the repeated impulses to magnet MAM and its copper slug which renders it slow to release. At the end of the impulse train relay A remains steadily operated and relay C restores the resistance of relay B being too high to permit holding of relay C in series with relay B. A test is made to determine if a preliminary movement of the selector wipers is required. If the digit received indicates that the selector is to be set in accordance with that digit alone the relevant contact in the bank of wiper MA3 will be connected over one of the group of marking wires to contacts in one or the other of the full line arcs M. If the digit received indicates that selection is to be made in accordance with this digit and a second digit, the relevant contact in the bank of wiper MA3 will be connected to either wiper MB3 or MB4 depending on which arc in the selector the group indicated by the first received digit is connected. Furthermore, if the desired group of outlets is connected in the arcs of even numbered wipers of the selector the relevant contact in the bank of wiper MA4, MB5 or MB6 will be connected to terminal ws for the operation of the wiper switching relay WS.

On the release of relay C, contact c2 closes a circuit over wiper MB1 at normal, contact pa2, wiper MA1 off normal, contacts bb1, t1, ta1 and k6 for magnet MU and also connects relay T in a preliminary testing circuit over wiper MA3. If the setting of switch MA indicates that a second digit is to be received and that selection is to take place in the full line arcs of the selector, fast acting relay T will operate immediately from earth over the circuit previously described for magnet MU up to contact c2, thence over rectifier MRA, both windings of relay T in series, wiper MA3, wiper MB3 at normal, the shunt across the right hand winding of relay PA, contact pa4 and the shunt across winding II of relay TA. Contact t1 changes over preventing operation of magnet MU, magnet MU not being able to operate in series with the number I winding of relay TA, and shunting the high resistance left hand winding of relay T. Relay PA operates very shortly after relay T by means of its right hand winding and locks up over its left hand winding, early make contact pa1, and contact b1. Relay TA does not operate because its windings I and II, both of which are now energised, are differentially connected, winding I of relay TA being energised in series with magnet MU after the removal of the short circuit across the relay winding at contact t1. Contact pa2 closes a circuit for re-operating relay C independently of wiper MA1, contact pa3 substitutes magnet MBM for magnet MAM in the impulse repeating circuit, and contact pa4 releases relay T and connects up relay LC for operation under overflow conditions. Both windings of relay TA become de-energised by the release of relay T, winding II because of contacts pa4 opening the circuit and winding I because of the short connected across it when relay T restored.

If the first digit indicated that a group in a broken line arc of the selector is to be searched, the group being completely determined by a second digit, the relevant contact in the bank of wiper MA3 would be connected to wiper MB4 and on the release of relay C at the end of the first digit the earth over relay T would be extended as before. However, as wiper MB3 will not now be connected to the contact on the bank MA3 and as wiper M1 is not resting on the first contact in the broken line arc but on the normal contact at the commencement of the full line arc, relay T will not be operated, but magnet MU will operate and the selector wipers will be driven round until the broken line wipers engage the first contacts in their arcs. When the wipers reach the last contacts in the full line arcs they will not be stopped as they would have been had they been searching these arcs as the circuit over these contacts will be open at this time at contact pa4, consequently the wipers will be driven past these contacts to the first contacts in the broken line arcs. In this latter position a circuit will be found for relay T over the contact in the arc of wiper M1, the wiper, contacts ws5, k7, ws4, wiper P1, shunt across the right hand winding of relay PA, contact pa4 and the shunt across winding II of relay TA. Relays T and PA will operate with the before mentioned results, relay TA not operating for the same reasons as previously described. Fast-operating relay T operates to connect the I winding of TA in series with magnet MU to stop the magnet.

If the digit received denoted a group determined solely by that digit, the circuit thru relay T would not be completed when relay C released after the first digit but the circuit to magnet MU would be closed over contacts c2, t1, and ta1 and magnet MU would operate to step the selector wipers to search for battery on the p lead of a subsequent switch in the outlet group marked on the full line arcs of wiper M1 or M2 by the marking wire leading from the MA3 arc contact.

A second digit is repeated to magnet MBM in exactly the same way as the first digit is repeated to magnet MAM and the relevant group is marked in the bank of wiper MB3 or MB4, as the case may be. Relay WS will be operated over wiper MA4, or MA4 and MB5 or MB6 if the digit or digits denote a group requiring wiper switching, contacts ws2—ws5 changing over the connections from the odd numbered wipers of the selector to the even numbered wipers.

As soon as the digit determining the wanted group has been received and relay C released magnet MU is operated and the selector wipers are driven in search of a free outlet in the wanted group. The earth for the test relay is applied over one of the relevant marking switch wipers and marking wires to all the contacts of the group in the marking bank M1 or M2 as the case may be and the battery denoting a free outlet will be applied to the test wire outgoing from the relevant contact in one of the test arcs P. When a free outlet is found relay T is operated in the circuit over the marking wipers of the marking switch, the relevant marking wire, marking wiper and test wiper of the selector to battery and at contact t1 stops the selector by switching winding I of relay TA into the circuit of magnet MU. Earth over the low resistance right hand winding of relay T is extended to the test wire to mark the outlet engaged. Relay TA operates by means of its winding I and opens a further point in the circuit for magnet MU at contact ta1. Contact ta2 operates switching relay H, and relay T which, on the operation of relay H becomes short circuited, is released. Contact ta3 applies earth to wiper MB2 and contact ta4 plays no part in the present circumstances. Relay H operates and locks to wire p over its two windings in series, the right hand winding being of high resistance, and contact h1 switches this wire and the two line wires through at contacts h2, h3 and h4 and closes a locking circuit for relay WS, if this has been operated, at contact h5. Consequent on the change over of contacts h3 and h4 relay A is released and in turn this releases relays B, BA, BB and TA and, if operated, PA and the supervisory lamp SL is extinguished. The opening of contact b3 releases relay K and the control circuit becomes disconnected from the selector. Release of relay BA re-connects the test-in circuit for all the selectors that are not already in use associated with the common control circuit. The release of relay BB closes the homing circuits for the marking switches, first over wiper MB1 off normal, contacts bb2, mbdm, and magnet MBM and when switch MB reaches normal the homing circuit for switch MA is closed over wiper MB1, at normal, contact pa2, wiper MA1 off normal, contacts bb1, madm and magnet MAM, the circuit being opened at wiper MA1 when the switch reaches normal.

The first selector illustrated does not include a feeding bridge and it is assumed that this will be connected in a subsequent circuit. The holding of the connection will therefore depend on the presence of earth on wiper p applied in the said subsequent circuit and there will be a number of switching relays and the caller's cut off relay all connected in parallel to wire p. There is a danger in such a case that when the holding earth is disconnected at the termination of a conversation the switching relays, due to their parallel connections will be somewhat tardy in releasing and should a selector test in to one of the circuits at that moment the resistance may be low enough to permit of operation of the test relay in the testing selector and so bring about a false connection. To guard against this the switching relays are furnished with two windings, one of which is of as high resistance as possible consistent with satisfactory operation while the other, which is connected in series with the first in the holding circuit, is of higher resistance so that under holding conditions a very high resistance is connected in each selector, too high for the series operation of a test relay even when as many serially connected circuits as are likely to be connected up in an exchange have their switching relays connected in parallel.

The high resistance switching relays hold on a small current consequently it is necessary to guard against the possibility of their being held due to reverse current leakage through the rectifier which is usually connected between wire p and the subscriber's meter. In practice there may be sufficient leakage of current via this rectifier to hold one switching relay but insufficient to hold two such relays in parallel. By connecting the rectifier to wire m which is connected to wire p on the wiper side of contact h1 of the first selector instead of on the line finder side improper holding of the switching relays may be avoided.

The succeeding selector may be one in which outlets are divided into two main groups, the required group being determined by the transmission or non-transmission of a signal from the first selector. The signal consists in the application of earth to the positive wire when the connection is switched through whereby a relay connected to this wire in the succeeding selector is prevented from operating. The grouping in the succeeding selector may be arranged so that one group is indicated by an even valued digit received at the first selector and the other group is indicated by an odd valued digit received at the first selector. When relay TA is operated contact ta3 connects earth to wipers MB2 and MA2. The alternate contacts in the banks of these two wipers are commoned and connected over contact k3 to the positive wire. If the signal is to be transmitted in respect of even valued digits the connection will be made to the even numbered contacts and the circuit will include wiper MB2 at normal and wipe MA2 on an even numbered contact for a single digit selection or wiper MB2 on an even numbered contact for a two-digit selection by the first selector.

If search for a free outlet in a marked group by the selector is unsuccessful the wipers are brought to rest on the last contacts in the arc in which search has been made over which relay T operates in series with the resistance shunting relays LC and TA independently of the marking wipers of the marking switch, relay LC having been connected up at contact pa4 consequent on the prior operation of relay PA. Relay LC and both windings I and II of relay TA are energised and the latter relay fails to operate because of the differential action of its windings. The operation of relay LC disconnects dialling tone at contact lc1 and substitutes busy tone over contact s1 and wire BT and at contact lc2 closes the circuit for an overflow meter, the meter operated being selected by the marking switches to correspond with the selected group.

When the caller clears on receipt of busy tone relay A is released and the control circuit is released in the manner before referred to, relay LC being released at contacts bb1 or bb2 as the case may be. Relay H not having been operated, the selector homes. When the connection is cleared after a conversation, relay H is released by disconnection of earth from wire p in known manner and at contact h5 closes the homing circuit for the selector magnet over contacts k6 and N1. When the selector wipers reach their normal position, contact N1 opens to stop the switch and contact N2 closes to complete the test-in circuit.

If, after taking the selector into use the caller fails to dial within a pre-determined time, or if the selector is taken into use due to a fault on the line, the control circuit is released but the selector is held. When the circuit is first seized relay C is operated and at contact c3 connects wiper MA6 to the left hand winding of relay S. The normal contact in the bank of wiper MA6 is earthed at intervals by what is known as an "S" pulse. When this occurs relay S operates and locks over its right hand winding, contact s2, wiper MA4 and contact b1. Contact s3 connects winding III of relay TA over wiper MA7 at normal to the "Z" pulse wire. If at the end of the predetermined time, that is the time between successive applications of the "S" and "Z" pulses no impulses have been received, so that switch MA has not been stepped, relay TA will be operated by the "Z" pulse. Contact ta4 will extend earth over contact b1, wiper MA4 and contact k5 to relay WS and that relay will operate, switch over the wiper connections and at contact ws6 prepare an alarm circuit. Contact ta2 operates relay H. The control circuit is now disconnected from the selector by the release of relay K and restored to normal consequent on the operation of relay H and release of relay A and the incoming loop is connected to battery over the left hand winding of relay WS and contact h7 and the normal contact in the bank of wiper —2 and to earth over the corresponding earthed contact in the bank of wiper +2. The selector, not having been moved off-normal does not close the normal holding circuit for relay WS over contact N1 and relay WS remains operated dependent of the continuance of the loop circuit or of an earth on the + wire. Earth connected to the normal contact in the bank of wiper P2 is extended over that wiper to hold relay H and to mark the selector engaged and is extended over contacts h1, N2, h6 and ws6 to the alarm circuit. When the loop is broken by the caller replacing his receiver or by the removal of the fault relay WS releases, its release being delayed slightly by the short circuit across its right hand winding over contact h7, and at contact ws6 opens the alarm circuit, disconnecting the battery therein from wire p, at contact ws4 releases relay H and at contacts ws2 and ws3 disconnects itself from the loop so that the selector circuit reverts to normal.

Relay S is also operated if a caller dials a "dead" number. For this purpose terminal s is connected to contacts in the bank of wiper MA4 or MB5 or MB6 corresponding to "dead" numbers, wipers MB5 and MB6 being connected to relevant contacts in the bank of wiper MA4 corresponding to first digits of "dead" numbers. If such a number is dialled, relay S will be operated and, consequent on the positioning of the selector wipers on the last contacts in their arcs relay LC will be operated and NU tone will be reverted over wire NU, contacts s1, lc1 and b2 and the windings of relay A. Relay TA will not be operated in this instance for the reason before given.

I claim:

1. In a telephone system, an automatic switch having a plurality of sets of wipers, each wiper set having access to a plurality of groups of contacts, control equipment associated with said switch responsive to received impulses to determine the set of wipers to be used and the group of contacts to be searched by a selected wiper set, means in said equipment operated in one instance in response to a single digit comprising a series of impulses to cause said equipment to select both a wiper set and a group of contacts, means in said equipment operated in another instance in response to a plurality of digits each comprising a series of impulses to cause said equipment to select a set of wipers and a group of contacts, a test circuit controlled by the first series of impulses in said last instance, and means controlled over said test circuit before a second series of impulses is received for advancing the wiper set or not to perform a further group selection.

2. In a telephone system, a selecting switch having access to a plurality of groups of lines, each group divided into sub-groups, a plurality of sets of wipers for said switch, one set of wipers having access to a particular group of lines from a normal position and another set having access to a different group of lines from an advanced position, marking equipment including a test relay, means in said equipment operated in response to the receipt of a particular first digit comprising a series of impulses to cause said switch to select a certain sub-group in said particular group of lines over said one set of wipers, means in said equipment operated in response to a different first digit comprising a series of impulses to cause said wipers to move to said advanced position, means in said equipment to select a certain sub-group in said different group of lines over the other set of wipers in response to a second digit comprising a series of impulses, and means including said test relay operated to control the movement of the wipers to said advanced position and also operated over either set of wipers to select an idle line in a selected sub-group.

3. In a telephone system, a single motion selector switch having a plurality of sets of wipers, each wiper set having access to a plurality of groups of contacts, an incoming line connecting with said switch, a plurality of outgoing lines connected to certain of the contacts in said groups of contacts, control equipment associated with said switch responsive to trains of impulses received over said incoming line to determine the set of wipers to be used and the group of contacts to be searched by a selected wiper, a dialling relay, means responsive to the seizure of said switch for operating said relay, circuit means responsive to the operation of said dialing relay for rendering said control equipment responsive to said trains of impulses, means for causing said relay to restore after the receipt of the first train of impulses received by said equipment, means in said equipment responsive to a particular first train of impulses for causing said switch to advance its wipers to an advanced position, a test relay operated to control the movement of the wipers to said advanced position, a steering relay, means including one of said wipers in said advanced position for operating said testing relay and said steering relay in series, and means responsive to the operation of said steering relay for reoperating said dialling relay to thereby permit said equipment to respond to a second train of impulses.

4. In an automatic telephone system, a single motion selector switch having wipers and groups of lines accessible thereto, control equipment associated with said switch and responsive to series of impulses each representing a digit received thereby to selectively control the operation of said switch, means in said equipment operated responsive to a particular digit comprising a series of impulses to cause said switch to search a particular group of said lines and responsive to a different digit comprising a series of impulses to advance said wipers to an advanced position preparatory to searching another group of said lines, a test relay, a control relay, a dialling relay, a circuit for operating said first two relays completed in said advanced position of the wipers, means operated by said testing relay to temporarily prevent further movement of the wipers, and means operated by said control relay to cause operation of the dialling relay, and means controlled by the operation of said dialling relay for conditioning said control equipment to be responsive to a subsequent digit comprising a series of impulses.

5. In an automatic telephone system, a single motion selector switch, a line connecting with said switch, control equipment associated with said switch for selectively controlling the operation of said switch, said equipment responsive to trains of impulses received over said line, a first stepping switch responsive to the first train of impulses received by said equipment and a second stepping switch responsive to the second train of impulses received by said equipment, each of said stepping switches having a plurality of banks of contacts thereon, a steering relay and a dialling relay in said equipment, a circuit for operating said dialling relay upon seizure of said switch including normal contacts in one bank of said first stepping switch in series with normal contacts in one bank of said second stepping switch, circuit means in said equipment for operating said steering relay after the receipt of a particular first train of impulses by said equipment including a contact in a different bank of said first stepping switch in series with normal contacts in a different bank of said second stepping switch, and means responsive to the operation of said steering relay for completing said dialling relay circuit independent of said first stepping switch.

6. In an automatic telephone system, a single motion selector switch, control equipment associated with said switch for selectively controlling the operation of said switch, a line connecting with said switch, means in said equipment for registering a plurality of digits received over said line in the form of impulses, a first stepping switch for registering the first digit received by said equipment, a second stepping switch for registering the second digit received by said equipment, a driving magnet for each of said stepping switches, a steering relay, a circuit for operating said steering relay including a contact on said first stepping switch in series with normal contacts on said second stepping switch, and circuit means for operating one or the other of said magnets, the magnet operated by said circuit means depending upon the operation or non-operation of said steering relay.

7. In an automatic telephone system, a single motion selector switch, control equipment associated therewith for selectively controlling the operation of said switch, a line connecting with said switch, first and second stepping switches having wipers and banks of contacts thereon in said equipment for respectively registering first and second digits received over said line in the form of impulses, said equipment including a testing relay and a preliminary testing circuit therefor; said testing circuit serially including a wiper on the first stepping switch, a contact on said first switch connected to a wiper of the second stepping switch, and a normal contact in said second switch.

8. In an automatic telephone system, a single motion selector switch having wipers and banks of contacts accessible thereto, said banks of contacts being grouped into pairs of associated banks, a line connecting with said switch, control equipment associated with said switch for selectively controlling the operation of said switch in accordance with impulses received over said line, a steering relay in said equipment, means including first contacts of one of said pairs of banks for operating said relay after the receipt of a first series of impulses, a busy relay, a circuit including the last contacts in certain of said pairs of banks and contacts on said steering relay for operating said busy relay, means for completing said circuit by the wipers of said switch engaging said last contacts in response to the receipt of a subsequent series of impulses, and means responsive to the operation of said busy relay for connecting a busy tone to said line.

9. In a telephone system, a plurality of groups of lines, a selecting switch having access to said plurality of groups of lines, a line leading to said switch, means associated with the switch for selecting a desired group of lines and selecting an idle line in the selected group, means operative in response to a single digit comprising a series of impulses in one instance to select one of said groups of lines and operative in response to a plurality of digits each comprising a series of impulses in another instance to select a different group of lines, said switch having a predetermined position to which it must be moved to select said different group of lines, and means effective after a first digit is received to perform a testing operation to determine whether it shall move to said predetermined position.

10. In a telephone system, a single motion selector switch having a plurality of sets of wipers, each wiper set having access to a plurality of group of contacts, outgoing lines connected to said contacts, control equipment associated with said switch responsive to received impulses to determine the set of wipers to be used and the group of contacts to be searched by a selected wiper, means in said equipment operated in response to the receipt of a single digit comprising a series of impulses to cause said switch to select a line in one of said groups over one set of wipers in one instance, a second means in said equipment operated in response to the receipt of a plurality of digits each comprising a series of impulses to cause said switch to select a line in said one of said groups over said one set of wipers in a second instance, and a third means in said equipment operated in response to the receipt of a plurality of digits each comprising a series of impulses to cause said switch to select a line in another of said groups over the other set of wipers in a third instance.

DOUGLAS PERCY LONG.

REFERENCES CITED

The following references are of record in the file of this patent:

UNITED STATES PATENTS

| Number | Name | Date |
|---|---|---|
| 1,679,522 | Grabe | Aug. 7, 1928 |
| 1,914,384 | Richardson | June 20, 1933 |
| 1,956,371 | Christian | Apr. 24, 1934 |